United States Patent [19]

Gaskell et al.

[11] Patent Number: 5,530,324
[45] Date of Patent: Jun. 25, 1996

[54] RESONANCE REDUCING ARRANGEMENTS

[75] Inventors: Edwin D. Gaskell, Driffield; William H. Stevens, Hull, both of England

[73] Assignee: Technology Systems Limited, United Kingdom

[21] Appl. No.: 190,013

[22] PCT Filed: Jul. 23, 1992

[86] PCT No.: PCT/GB92/01362

§ 371 Date: May 27, 1994

§ 102(e) Date: May 27, 1994

[87] PCT Pub. No.: WO93/02462

PCT Pub. Date: Feb. 4, 1993

[30] Foreign Application Priority Data

Jul. 24, 1991 [GB] United Kingdom ............. 9115950

[51] Int. Cl.⁶ ................. H01F 7/13; G01R 1/14
[52] U.S. Cl. ................. 318/135; 360/78.06; 360/78.04; 318/560
[58] Field of Search ................. 318/119, 135, 318/685, 687, 696, 560, 561; 360/78.06, 78.07, 78.08, 78.09, 78.13, 78.04

[56] References Cited

U.S. PATENT DOCUMENTS

| | | | |
|---|---|---|---|
| 4,286,212 | 8/1981 | Staebler | 324/125 |
| 4,486,797 | 12/1984 | Workman | 360/78 |
| 4,609,954 | 9/1986 | Bolton et al. | 360/78.06 |
| 4,945,294 | 7/1990 | Anderson, Jr. | 318/119 |
| 5,243,241 | 9/1993 | Wang | 310/36 |
| 5,406,412 | 4/1995 | Zehnpfennig et al. | 359/399 |

FOREIGN PATENT DOCUMENTS

| | | |
|---|---|---|
| 3323370 | 1/1985 | Germany. |
| 3519348 | 12/1986 | Germany. |

*Primary Examiner*—Steven L. Stephan
*Assistant Examiner*—Judson H. Jones
*Attorney, Agent, or Firm*—William A. Drucker

[57] ABSTRACT

The invention relates to a resonance reducing arrangement for a device displaceable between two positions.

In one described embodiment the device (14) is displaced against the resilience of a spring (11) by causing an electrical device (15) to accelerate the device (14) towards its second position, terminating the force accelerating the device (14) to allow the device to continue to displace towards the second position and then reactivating the electrical device (15) to cause the electrical device (15) to expand to that position at which it holds the device (14) in its second position.

19 Claims, 1 Drawing Sheet

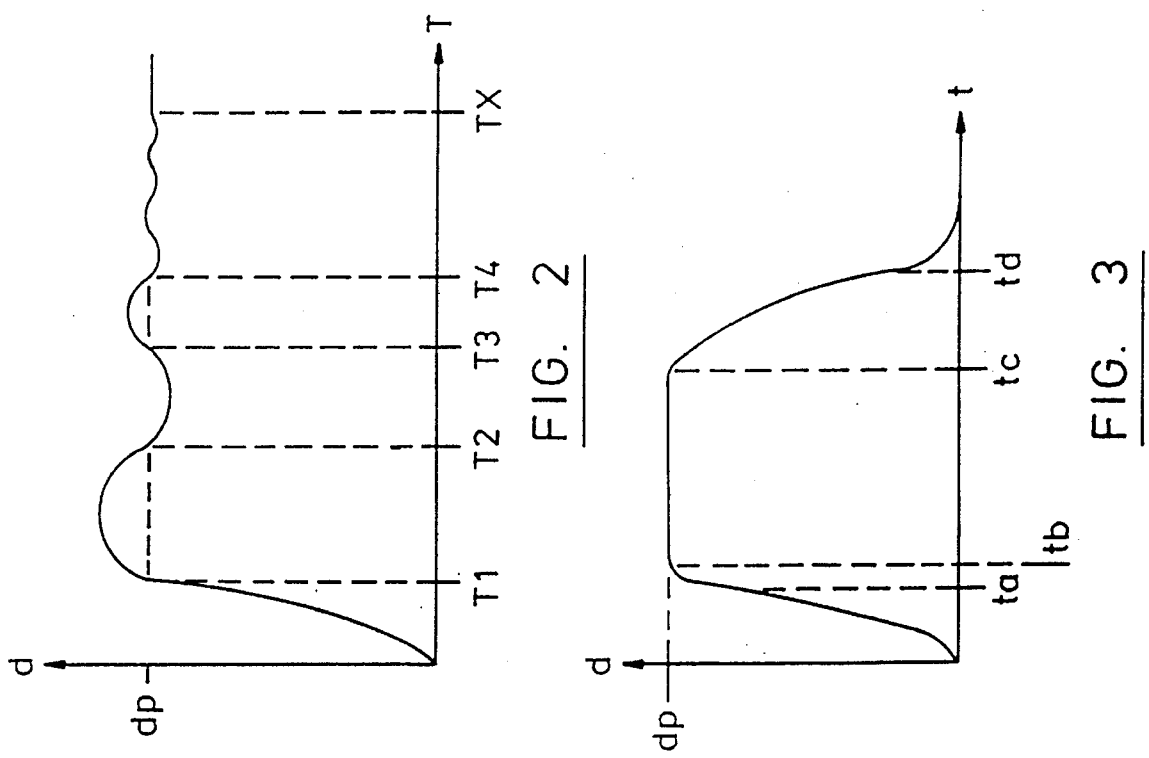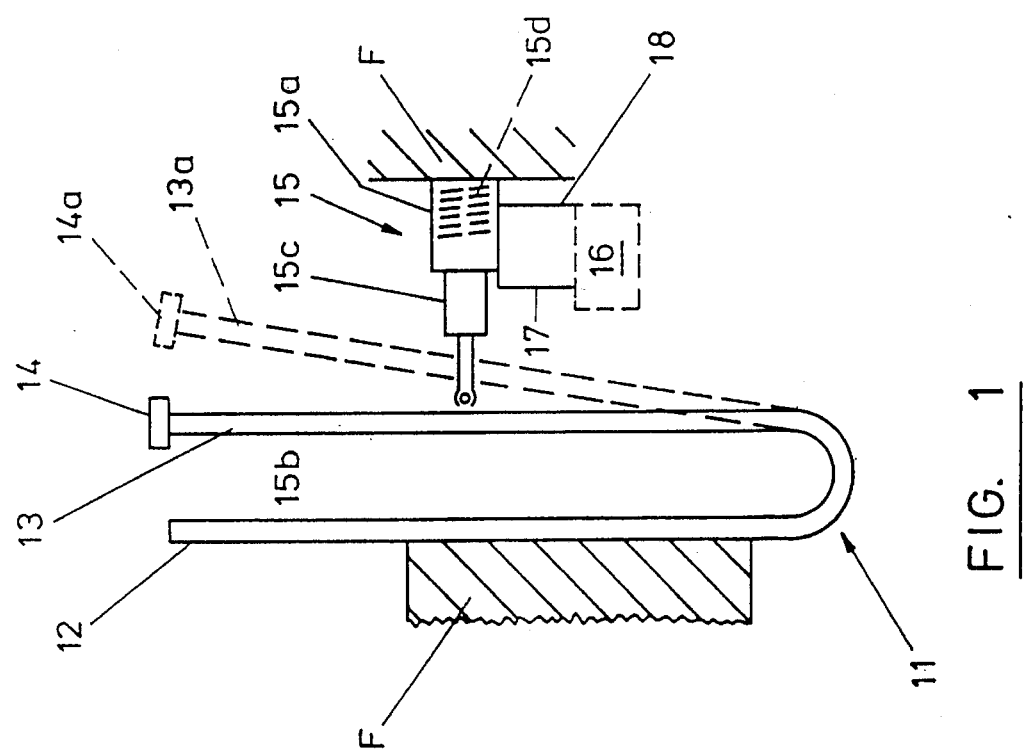

RESONANCE REDUCING ARRANGEMENTS

This invention relates to resonance reducing arrangements and more particularly, but not exclusively, to arrangements for reducing resonance in displaceable mechanical elements and devices, hereinafter called "devices".

With all mechanically displaceable devices a force application means essentially applies a force to the device to displace the device from a first position to a desired displaced position.

When the device is such, or is so arranged, that in the displaced position the device is under a resilient load, urging the device to return to its first position, the force applied by the said force application means must be sufficient to displace the device to the desired displaced position and the force application means must be displaced to a position where it can hold the device at the said displaced position for as long as is desired.

In the prior art methods for displacing a device against a resilient loading with a relatively slow displacement of the device to the desired displaced position the force application means can maintain contact with the displaceable device, whereupon a smooth, resonance-free displacement can be obtained.

When a rapid movement of the device is required, the force application means must rapidly accelerate the device to the desired position, at which position the force application means will stop accelerating the device and adopt a position where it can retain the device in the desired displaced position.

However, as at the time the device reaches the desired position said device has momentum, the said device will travel beyond the desired position until the momentum of the device is balanced by the resilient forces urging the device to return to its first position, whereupon the device will be accelerated back towards the desired position.

At the desired position the device will strike, or will otherwise be influenced by, the force application means and the momentum of the returning device will be resisted by the force application means but when the momentum of the device at the desired position exceeds the holding force of the force applicator means the device will to pass through the desired position, causing displacement of the force application means, until the force applied by the force application means overcomes the momentum of the device, whereupon the force application means will again accelerate the device towards and beyond the desired displaced position. Thus, the device is caused to resonate or vibrate, with reducing amplitude, until it becomes relatively stable at the desired displaced location.

The problem of resonance of the device at the desired location is particularly disadvantageous with such devices as mirror displacing means, for example "Q" switches in laser constructions, and wherein the response time for the mirror to displace to and settle at a predetermined displaced position can be critical to the efficiency of the laser.

According to the present invention there is as provide a method for reducing resonance of a displaceable device comprising the steps of causing a force application means to displace to deliver a displacement force pulse to the device to initiate displacement of the device in the desired direction from its first position, terminating the displacement force pulse accelerating the device before the device reaches its predetermined position, and reactivating the force application means to cause said force application means to displace to that position where it will hold the device in the desired displaced position.

Preferably the method is characterised by the steps of arranging the said displacement force pulse to be of such magnitude and duration as to cause the displaceable device to accelerate towards its desired displaced position and, when the displacement force pulse is removed, to decelerate toward said desired displaced condition so as to approach said desired displaced position with reducing velocity.

Preferably the method includes the steps of reactivating the force application means whilst the device is decelerating towards its desired displaced position.

In a preferred embodiment the method is characterised by the steps of causing the said force application means when reactivated to reach that position where it will retain the device in the desired displaced position substantially as the said device reaches its desired displaced position.

In one embodiment the method is characterised by the steps of displacing the device to said desired position and supporting said device in said displacement position, causing the force application means to release the device to allow the device to freely accelerate towards its first position, reactivating the force application means to engage the device to cause said device to decelerate before the device reaches said first position and then deactivating the force application means to allow the device to return to its first position.

Preferably the method includes the steps of, after decelerating the device, allowing the device to return freely to its first position.

In one preferred embodiment the method includes the steps of positioning the said force application means to arrest the device as the device reaches its said first position.

The present invention further envisages a method of displacing a mirror in a laser system characterised by the steps of supporting the mirror in its first position, whereupon the laser beam is directed along one path, and displacing the mirror to a displaced position wherein the laser beam is directed along a second path.

The invention further envisages apparatus, for carrying out the method according to the invention, characterised by a displaceable force application means, arranged to displace said device from a first position towards a desired displaced position and to hold said device at said desired displaced position, and a control means arranged to cause the said force application means to make a first displacement movement to accelerate the said device towards said desired displaced position, to terminate the first displacement movement of said force application means before the said force application means reaches that position at which it supports the said device in the desired displaced position, and then to reactivate the force application means to make a displacement movement to that position in which it supports the said device in the desired displaced position.

Preferably the said control means includes timing means for controlling the duration of the first displacement movement of the force application means and the delay before reactivating the said force application means.

In one embodiment the said force application means is arranged to support the device in the desired position and the control means includes means for causing the support of the force application means to be rapidly removed, to allow the device to freely accelerating towards its first position, and means for reactivating the force application means to arrest the freely accelerating device near the said first position for said device.

Preferably, on arresting the device near the first position for said device, the force application means displaces to support the device in said first position.

Preferably the said force application means comprises an electrical device of the type which undergoes a change of shape in dependence upon the level of electrical power extended thereto.

In one embodiment the said force application means comprises an electro-strictive device.

In another embodiment the said force application means comprises a magneto-strictive device, In a further embodiment the said force application means comprises a piezo-electric device.

In a preferred embodiment the apparatus is characterised by resilient means continuously urging said device towards said first position.

Preferably said resilient means comprise spring means arranged to continuously urge said device towards said first position.

In one embodiment the device comprises a mirror in a laser system and wherein the mirror is displaced between one position where the laser beam is directed along one path and a second position wherein the laser beam is directed along a second path.

The invention will now be described further by way of example with reference to the accompanying drawings in which, FIG. 1 shows, in side view, an electrical-driven mechanical device arranged to be displaceable between a rest position and a desired displaced position, FIG. 2 shows a graph of the displacement of the device illustrated in FIG. 1, plotted against time, when displaced by prior art displacing arrangements, and FIG. 3 shows a graph of the displacement of the device illustrated in FIG. 1, plotted against time, when displaced by the arrangement proposed by the invention.

In the embodiment illustrated in FIG. 1 a metal U-shaped member 11, conveniently made of a spring steel so as to have a high degree of flexure and resilience, has one limb 12 secured to a fixed part, for example a machine frame F, and the other limb 13 supporting a mirror 14 on its free end.

A force application means, in this example a solenoid device 15, extends between the arm 13 and a fixed part of the machine frame F. The windings 15a of the solenoid device 15 are secured to the machine frame F and an arm 15b, integral with the core 15c of the solenoid 15, is pivotally attached to the arm 13. The solenoid 15 also includes a coil compression spring 15d resiliently urging the solenoid 15 to its extreme extended position and thus, when the solenoid 15 is deactivated and in its extreme extended condition, the arm 13 lies in its unstressed position, as shown in FIG. 1.

The solenoid device 15 is controlled by an electric circuit, generally identified by numeral 16, via leads 17 and 18.

When the limb 13 is to be displaced away from its unstressed position, shown in full line in FIG. 1, to a desired position 13a, shown in broken line in FIG. 1, and whereupon the mirror 14 is displaced from the position shown in full line to the position 14a shown in broken line, the electrical circuit 16 powers the solenoid device 15, via leads 17 and 18, to cause said solenoid 15 to contract to a reduced length condition, determined by the strength of the magnetic field generated in the windings 15a and the compression of the spring 15d. The required strength of the magnetic field necessary to support the arm 13 in the desired displaced position can be readily determined.

Consider now the displacement of the arm 13 to the desired displaced position 13a by the prior art method of operation, illustrated graphically in FIG. 2, and wherein displacement d of the arm 13 from its unstressed position is plotted against time T.

With reference to FIG. 2, and when electrical power is extended by the circuit 16 to the solenoid 15, the core 15c is attracted into the windings 15a and accelerates the arm 13 away from the rest position for a period T1, at the end of which the solenoid 15 is in that predetermined extension position at which it should hold the arm 13 in the desired displaced position.

However, on termination of the displacement movement of the solenoid 15, the arm 13 still has momentum and the said arm 13 will therefore continue to displace away from the rest position until the inherent resilience in the U-shaped member 11, and the resistance of the solenoid 15, to further contraction, overcomes the momentum of the arm 13, whereupon the arm 13 will stop and, under the said resilience of the member 11 and action of the solenoid 15, said arm will accelerate back towards the desired position 13a and will reach the position 13a at time T2.

At time T2, accelerating arm 13 will pass through the desired displaced position 13a, displacement beyond said desired displaced position will be resisted by the solenoid 15 but, in the event, the momentum of the arm 13 will cause the solenoid to extend from its required length until the magnetic force acting on the core 15c overcomes the momentum of the arm 13 and again accelerates the arm 13 towards the desired position 13a.

At a time T3 the solenoid 15 will again be at its required length position but the arm 13 will still have momentum and will again pass through the predetermined position 13a until, once again, the momentum of the arm 13 is overcome by the resilience of the U-shaped member 11 and the resistance of the solenoid 15 to change from the desired length.

The displacement of the arm 13 to either side of the desired position 13a will continue, with reduced amplitude, until after a time TX the arm 13 becomes relatively stable at the desired position 13a.

Thus, when it is essential that the mirror 14 be stable at the position 14a, the time taken for mirror 14 to become stable at position 14a will be time TX.

In the method proposed by the present invention the solenoid 15 is given an actuating pulse by the circuit 16 but the pulse is held only for a time ta, which is shorter than the time taken by the solenoid 15 to contract to its desired length to hold the arm 13 in the position 13a.

Thus, after the time period ta the displacement of the solenoid device 15 is arrested but the arm 13, having been accelerated by the solenoid device 15, has sufficient momentum as to continue displacing away from the rest position towards the displaced position 13a. The momentum of arm 13 is resisted by the natural resilience of the member 11, and the resistance of the solenoid 15 to reduce its length, continuously acting to reduce the velocity of the arm 13.

The length of the pulse ta is carefully controlled so that, at the point where the arm 13 reaches zero velocity the said arm 13 is approximately in the position 13a.

After a time period tb power is again applied to the solenoid device 15. Whilst the arm 13 is decelerating, it is contracting the solenoid 15 towards that position where the solenoid 15 has the length to hold the arm 13 in the desired position 13a and therefore, when the power is extended to the solenoid 15 after period tb the solenoid is substantially in its desired position and the power has simply to establish the magnetic field to hold the said solenoid in the desired length condition, whereupon the actuation of the solenoid 15 to it's arm 13 holding position is substantially instantaneous.

With the arm 13 substantially at zero velocity at the position 13a, and the solenoid 15 being powered to hold the arm 13 in the position 13a, the assembly is substantially stable and resonance free so that a very rapid, stable, positioning of mirror 14 in the position 14a is obtained.

The invention may also be practised when returning the arm 13 to the rest position and, as will be seen from FIG. 3, when the power to the Solenoid 15 is terminated at period tc, the natural resilience of the member 11, in combination with the action of the return spring 15d, accelerates the arm 13 towards the rest position and on reaching the rest position the arrangement will normally resonate.

In accordance with the teachings of the invention a power pulse is applied to the solenoid 15 at a point td, to urge the solenoid to contract and thus decelerate the arm 13, until said arm 13 is substantially at its rest position and has little, if any, velocity, when the power to the solenoid can be discontinued.

Whilst in the above described embodiment the force application means has been described as a solenoid the invention is not restricted thereto and said force application means may comprise any electrically driven means capable of undergoing a change of shape in response to electrical power supplied thereto and thus, said means may conveniently comprise an electro-strictive device a magneto-strictive device, or a piezo-electric device.

Further, whilst the invention has been described with reference to a device for moving a mirror the invention is not restricted thereto and the invention can be used in a wide range of applications where resonance is undesirable.

We claim:

1. A method for reducing resonance of a displaceable device comprising the steps of:

(a) activating a force application means to cause said force application means to deliver a displacement force pulse to the device to initiate displacement of the device in a desired direction from its first position toward a predetermined second position, (b) terminating said displacement force pulse displacing said device before said device reaches its predetermined second position, and (c) reactivating the force application means to cause said force application means to displace to that position where it will hold the device in said second position.

2. A method according to claim 1, characterised by the steps of arranging said displacement force pulse to be of such magnitude and duration as to cause the displaceable device to accelerate towards its second position and, when the displacement force pulse is removed, to decelerate toward said second condition so as to approach said second position with reducing velocity.

3. A method according to claim 1, characterised by the steps of reactivating the force application means whilst the device is decelerating towards its second position.

4. A method for reducing resonance according to claims 1, characterised by the steps of causing said force application means when reactivated to reach that position where it will retain the device in the second position substantially as said device reaches its second position.

5. A method according to claim 1 characterised by the steps of displacing the device to said desired position and supporting said device in said displacement position, causing the force application means to release the device to allow the device to freely accelerate towards its first position, reactivating the force application means to engage the device to cause said device to decelerate before the device reaches said first position and then deactivating the force application means to allow the device to return to its first position.

6. A method according to claim 5, characterised by the steps of, after decelerating the device, allowing the device to return freely to its first position.

7. A method according to claim 5, characterised by the steps of positioning said force application means to arrest the device as the device reaches its said first position.

8. A method of displacing a mirror in a laser system, characterised by the steps of supporting the mirror in its first position, whereupon the laser beam is directed along one path, and displacing the mirror to a displaced position wherein the laser beam is directed along a second path.

9. Apparatus for reducing resonance of a displaceable device characterised by a displaceable force application means, arranged to displace said device from a first position towards a desired displaced position and to hold said device at said desired displaced position, and a control means arranged to cause the said force application means to make a first displacement movement to accelerate the said device towards said desired displaced position, to terminate the first displacement movement of said force application means before the said force application means reaches that position at which it supports the said device in the desired displaced position, and then to reactivate the force application means to make a displacement movement to that position in which it supports the said device in the desired displace position.

10. Apparatus according to claim 9 characterised in that the said control means includes timing means for controlling the duration of the first displacement movement of the force application means and the delay before reactivating the said force application means.

11. Apparatus according to claim 9, characterised in that the said force application means is arranged to support the device in the desired position and the control means includes means for causing the support of the force application means to be rapidly removed, to allow the device to freely accelerating towards its first position, and means for reactivating the force application means to arrest the freely accelerating device near the said first position for said device.

12. Apparatus according to claims 9, characterised in that, on arresting the device near the first position for said device the force application means displaces to support the device in said first position.

13. Apparatus according to claim 9, inclusive, characterised in that the said force application means comprises an electrical device of the type which undergoes a change of shape in dependence upon the level of electrical power extended thereto.

14. Apparatus according to claim 13, characterised in that the said force application means comprises an electrostrictive device.

15. Apparatus according to claim 13, characterised in that the said force application means comprises a magnetostrictive device.

16. Apparatus according to claim 13, characterised in that the said force application means comprises a piezoelectric device.

17. Apparatus according to claim 9 characterised by resilient means continuously urging said device towards said first position.

18. Apparatus according to claim 17 characterised in that said resilient means comprise spring means arranged to continuously urge said device towards said first position.

19. Apparatus according to any one of claims 8 to 18 inclusive, characterised in that the device comprises a mirror in a laser system and wherein the mirror is displaced between one position where the laser beam is directed along one path and a second position wherein the laser beam is directed along a second path.

* * * * *